United States Patent
Nimmagadda

(10) Patent No.: US 8,861,710 B2
(45) Date of Patent: Oct. 14, 2014

(54) PLAYING EXPECTED WAIT TIME ON AGENT'S NOTIFICATION

(75) Inventor: Krishna Nimmagadda, Maharastra (IN)

(73) Assignee: Avaya Inc., Basking Ridge, NJ (US)

( * ) Notice: Subject to any disclaimer, the term of this patent is extended or adjusted under 35 U.S.C. 154(b) by 706 days.

(21) Appl. No.: 12/783,272

(22) Filed: May 19, 2010

(65) Prior Publication Data

US 2011/0286592 A1  Nov. 24, 2011

(51) Int. Cl.
*H04M 3/00* (2006.01)
*H04M 5/00* (2006.01)
*H04M 3/523* (2006.01)

(52) U.S. Cl.
CPC ............................ *H04M 3/5238* (2013.01)
USPC ........... 379/266.06; 379/265.01; 379/265.03; 379/265.1; 379/265.11; 379/265.13

(58) Field of Classification Search
USPC ............... 379/265.1, 265.11, 265.14, 266.01, 379/266.03, 266.06
See application file for complete search history.

(56) References Cited

U.S. PATENT DOCUMENTS

| | | | |
|---|---|---|---|
| 5,790,974 | A | 8/1998 | Tognazzini |
| 5,999,617 | A | 12/1999 | Oyanagi et al. |
| 6,148,396 | A | 11/2000 | Chrysos et al. |
| 6,366,666 | B2 | 4/2002 | Bengtson et al. |
| 6,714,643 | B1 | 3/2004 | Gargeya et al. |
| 6,728,363 | B2 | 4/2004 | Lieberman et al. |
| 6,996,603 | B1 | 2/2006 | Srinivasan |
| 2004/0120502 | A1* | 6/2004 | Strathmeyer et al. ..... 379/265.01 |
| 2007/0291922 | A1 | 12/2007 | Matteo et al. |
| 2009/0261157 | A1* | 10/2009 | Kumar et al. ................. 235/375 |
| 2010/0190477 | A1 | 7/2010 | Williams et al. |

OTHER PUBLICATIONS

Official Action for U.S. Appl. No. 13/648,096, mailed Mar. 27, 2013, 9 pages.
Notice of Allowance for U.S. Appl. No. 13/648,096, mailed Aug. 22, 2013, 8 pages.

* cited by examiner

*Primary Examiner* — Khai N Nguyen
(74) *Attorney, Agent, or Firm* — Sheridan Ross P.C.

(57) ABSTRACT

Systems and methods for providing estimated wait times are provided. More particularly, an estimated wait time is calculated based at least in part on agent availability information entered by the agent. The agent availability information may be obtained from the agent through a user interface provided by a contact center communication device. The user interface may include soft keys. In addition, the estimated wait time can be provided to client communication devices.

17 Claims, 4 Drawing Sheets

PLAYING EXPECTED WAIT TIME ON AGENT'S NOTIFICATION

FIELD

The present invention is directed to providing an estimated wait time to users requesting access to a resource.

BACKGROUND

Call centers are systems that enable agents to serve incoming and/or outgoing calls, with the calls being distributed and connected to whichever of the agents is available to handle the call. When no agents are free and available to handle an incoming call, additional incoming calls are typically placed in a holding queue to await an available agent. It is common practice to divide a pool of agents into a plurality of groups, commonly referred to as splits, and to assign different types of calls to different splits. The different splits may be organized such that they are directed to servicing particular products or offerings, and the agents in different splits may have different skills. Each split typically has its own incoming call queue. In addition, agents may be distributed across a number of call centers.

In a typical inbound contact center arrangement, customer service representatives handle a variety of incoming calls. For each new call that a call center receives, decisions can be made by call routing algorithms as to whether a call should be assigned to an available agent or held in a queue for an agent more likely to have the skills required to handle the call. For an outbound contact center, the decision of when to place a predictive dialing call can be based on the expected remaining work time of all agents that might be able to handle the call about to be placed.

One of the inputs to call routing algorithms can be the expected remaining work time of each agent. Typically, this estimate is based on the average call time. Moreover, the average call time can be computed separately for different types of calls, in order to improve the accuracy of the estimate. Expected wait time can be calculated by calculating the average call holding time for all calls of a particular class, and then subtracting the time an agent has spent on the call up to the point at which the estimate is made. However, the estimated remaining work time for a particular call being handled by an agent is only a general estimate, and does not take into account the current pace of the call in progress with that agent. Accordingly, estimated wait time announcements, which are played to callers waiting in queue, can be inaccurate. For example, current solutions do not consider whether an agent is intending to enter an auxiliary mode or otherwise break from handling calls when a current call is finished, and do not consider particular issues that may be raised during a call in progress.

SUMMARY

The present invention is directed to solving these and other problems and disadvantages of the prior art. Generally, according to embodiments of the present invention, a work item (e.g., a call) is routed to a server or switch for handling. If an agent is not currently available to handle the work item, that work item is placed in a queue. For work items placed in a queue, an expected wait time is calculated. This expected wait time can be presented to a person (e.g., a customer or caller) associated with the work item. Moreover, embodiments of the present invention provide for input from or updates by an agent regarding an estimated time to availability of the agent. The information received from the agent is then used to calculate an updated estimated wait time. This updated estimated wait time is then provided for use in association with the work item. For example, where the work item is associated with a caller, the updated estimated wait time is reported to the caller. As another example, where the work item is associated with a call that will be placed by a predictive dialing system, the updated expected wait time is provided to the predictive dialing system.

In accordance with further embodiments of the present invention, an input is presented to an agent, for accepting information regarding the agent's availability. For example, the input that is presented can be in the form of a soft key or keys. These keys allow the agent to indicate information known to the agent that is relevant to the calculation of an estimated wait time. For example, the agent may indicate whether a work item is associated with a new or existing client. As a further example, the agent may indicate whether the call is in a wrap up stage or state. As yet another example, the agent may indicate an estimated time to availability.

A call center or switch in accordance with embodiments of the present invention includes application programming for calculating an estimated wait time for work items in queue. More particularly, embodiments of the present invention accept input from an agent, indicating the agent's expected availability. This input from the agent is used to provided an updated expected wait time that can be reported to a caller associated with a work item, or to other system components.

Additional features and advantages of embodiments of the present invention will become more readily apparent from the following description, particularly when taken together with the accompanying drawings.

DETAILED DESCRIPTION

Figure 1:
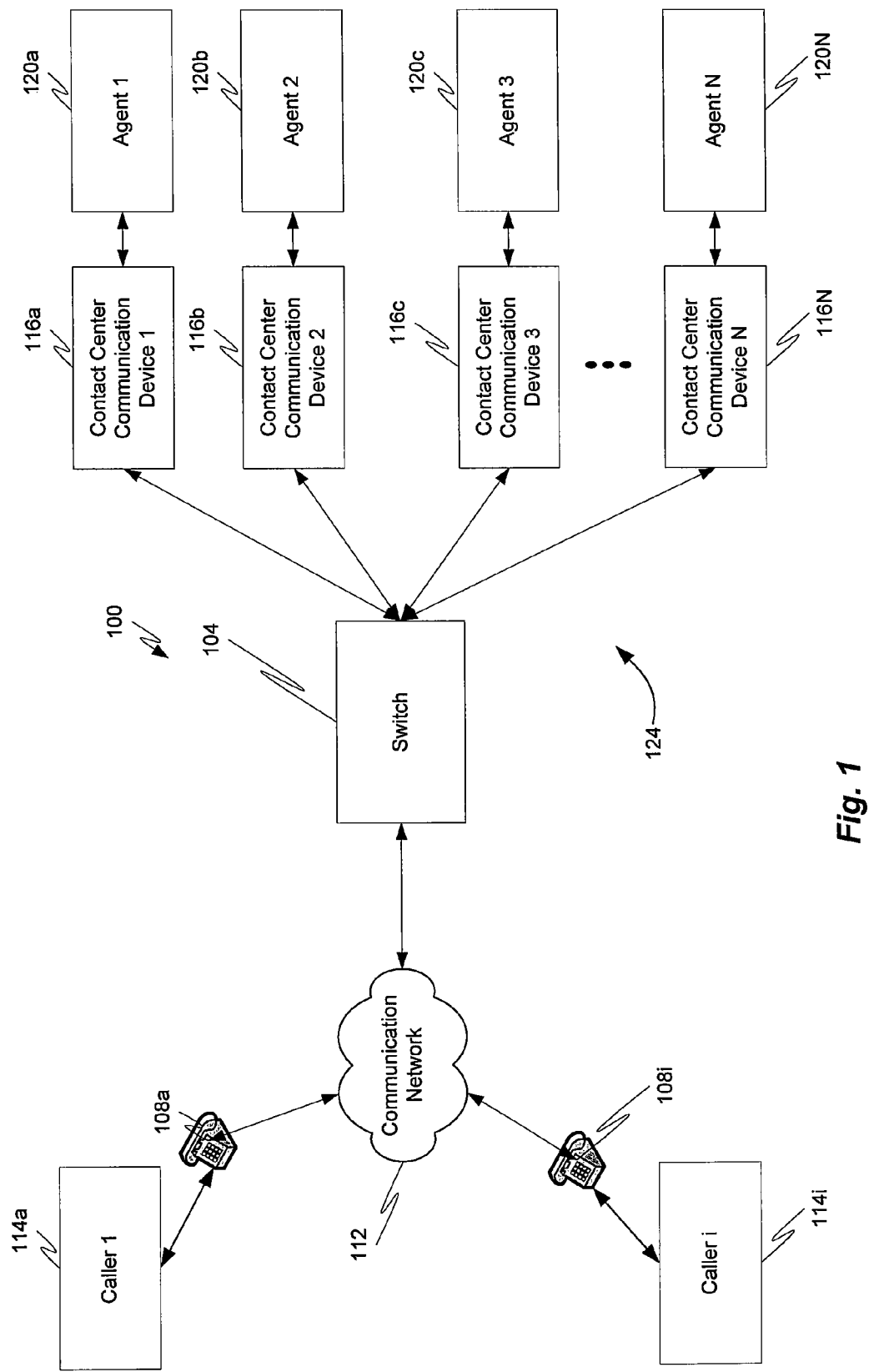
FIG. 1 is a diagram depicting components of a system in accordance with embodiments of the present invention.

FIG. 1 is a block diagram depicting components of a system 100 in accordance with embodiments of the present invention. In general, the system includes a communication server or switch 104 interconnected to a plurality of client communication devices 108*a-i*, through a communication network 112. The communication devices 108 may each be associated with a user or caller 114*a-i*.

The switch 104 is associated with a contact center 124. The contact center 124 includes a plurality of contact center communication devices 116*a-n*. Each contact center communication device 116 may be associated with an agent 120*a-n*. In general, a contact center 124 may function to handle calls or other inquiries placed by clients or users. Alternatively or in addition, a contact center 124 may operate to place outgoing calls. The contact center 124 includes the switch 104, for routing incoming and/or outgoing calls or contacts. As will be discussed in greater detail elsewhere herein, the switch 104 may function to place incoming calls in one or more queues.

For embodiments in which the switch 104 alternatively or additionally operates as a predictive dialing system, the switch 104 may function to schedule and place outgoing calls.

The contact center communication devices 116a-n provide an interface for human agents 120a-n, to enable those agents 120a-n to interact with callers or users 114a-i. Accordingly, a contact center communication device 116 can include an interconnection to the switch 104, to support the exchange of data between the switch 104 and the contact center communication device 116. Each contact center communication device 116 also generally includes a user output, for presenting information to an associated agent 120, and one or more user input devices, for receiving input from an associated agent 120. Examples of user output devices include speakers or other audio outputs, and visual displays. Examples of user input devices include microphones, keyboards, keypads, and pointing devices. In addition, user input and output devices may be combined, for example in the form of a touch screen. Moreover, as will be discussed in greater detail elsewhere herein, a contact center communication device 116, in accordance with embodiments of the present invention, provides one or more inputs for receiving information indicating a time to availability of an associated agent 120. Accordingly, an example of a contact center communication device 116 is a networked computer that supports voice over Internet protocol (VoIP) telephony communications between an agent 120 and a caller 114, and the exchange of data between the switch 104 and the contact center communication device 116 in association with a graphical user interface presented to the user 120 by the contact center communication device 116. A further example of a contact center communication device 116 includes a combination of a hardware telephone for supporting voice communications between an agent 120 and a caller 114, and a networked or general purpose computer for supporting the exchange of data between the switch 104 and the agent 120. As yet another example, the contact center communication device 116 may comprise a networked or general purpose computer with instant messaging, email, or other communication system that supports the exchange of messages between an agent 120 and a user or caller 114.

A user communication device 108 may comprise a voice telephony device, such as a hardware telephone or a soft phone implemented in connection with a general purpose computer. In accordance with still other embodiments, the user communication device 108 may comprise or be associated with a networked or general purpose computer that supports text messaging, email, or other communications over a communication network 112.

The communication network 112 may comprise a public switched telephone network (PSTN), a packet data network, such as a local area network, an intranet, the Internet, or any combination of communication networks.

Figure 2:
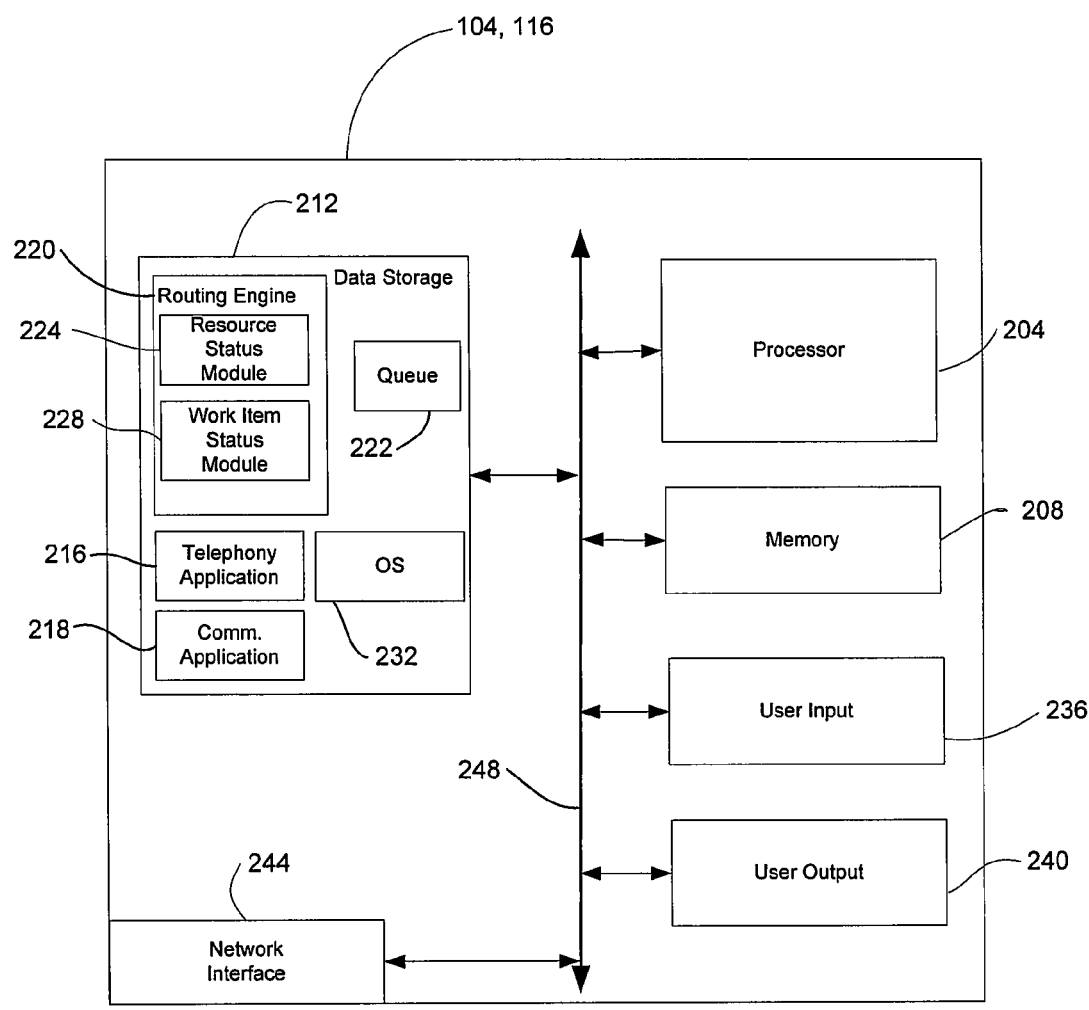
FIG. 2 is a block diagram of a communication server or a communication device in accordance with embodiments of the present invention.

With reference now to FIG. 2, a communication server or switch 104 is illustrated. In general, the switch 104 may comprise a general purpose computer, a call center server, a telecommunications switch, or a private branch exchange. More particularly, the switch 104 may include a processor 204, memory 208, data storage 212, and a network interface 244. The components of the switch 104 may be interconnected by a communications bus 248.

The processor 204 may include any processor capable of performing instructions encoded in software. In accordance with other embodiments of the present invention, the processor 204 may comprise a controller or application specific integrated circuit (ASIC) having and capable of performing instructions encoded in logic circuits. The memory 208 may be used to store programs or data, including data comprising a queue or queues, in connection with the running of programs, modules or instructions on the processor 204. As examples, the memory 208 may comprise RAM, SDRAM, or other solid state memory. Alternatively or in addition, data storage 212 may be provided. The data storage 212 may generally include storage for programs and data. For example, the data storage 212 may store various applications or modules, including a telephony application 216, a communications application 218, a routing engine 220, a work item queue 222, a resource status module 224, and a work item status module 228, capable of execution by the processor 204. The data storage 212 may additionally provide storage for operating system code 232. Like the memory 208, the data storage 212 may comprise a solid state memory device. Alternatively or in addition, the data storage 212 may comprise a hard disk drive or other random access memory. In accordance with still other embodiments, the memory 208 may provide random access storage, while some or all of the data storage 212 may comprise read only storage.

Examples of a user input 236 can include a keyboard, microphone, touchpad, or display operated in connection with a pointing device. Examples of a user output 240 include a visual display, speaker, or indicator lamp.

The network interface 244 may be provided to interconnect the switch 104 to other devices, either directly or over a computer or communication network, such as the communication network 112. The network interface 244 may comprise multiple interfaces. Although one network interface 244 is depicted, other network interfaces may be provided, for example where connections between the communication network 112 interconnecting the switch 104 to user devices 108 is different or segregated from a network interface 244 for interconnecting the switch 104 to contact center communication devices 116.

The telephony application 216 may comprise an application to support voice over Internet protocol telephony, or telephony over the public switched telephony network. The telephony application 216 can further include support for video telephony. The communications application 218 operates to support text based messaging applications, such as instant messaging, email or other communications modalities.

Another application that can be stored in data storage 212 is a routing engine application 220. The routing engine application 220 functions to categorize incoming (or outgoing) calls. For example, for operation in a contact center 124 that handles incoming calls, the routing engine 220 may place incoming calls into one or more queues 222 to await service by a contact center agent 120. In accordance with further embodiments, the routing engine application 220 may route an incoming call to one of a plurality of queues, based on various criteria. For example, the queue to which an incoming call is routed may be selected based on the identity of the caller, the subject matter of the call, for example as indicated by the caller 114 through the telephone number or other address used by the caller 114 to contact the contact center 124, or through the selection of a particular menu item by the caller 114.

A resource status module 224 may be included to track the status of resources, including agents 120. As illustrated, the resource status module 224 may be provided as part of the routing engine application 220. Alternatively or in addition, some or all of the functions of the resource status module 224 may be provided and/or operated separately from the routing engine application 220. Functions of the resource module 224 can include receiving information from agents 120 regarding estimated times to availability. A work item status module 228 may also be provided. Like the resource status module 224, the work item status module 228 may be provided as part of the routing engine 220, or partially or entirely separate from the routing engine 220. The work item status module 228 functions to track the status of work items. For example, in connection with a contact center 124 operating to receive incoming calls, the work item status module 228 can track the amount of time that work items (e.g., calls) have been waiting in queue 222 for service. The work item status module 228 can also track attributes of work items, such as information regarding an associated caller 114, information regarding the subject matter of the work item, or other information.

FIG. 2 is also an illustration of exemplary caller communication device 114 and of a contact center communication device 116. As can be appreciated by one of skill in the art, a caller communication device 114 and/or a contact center communication device 116 may be implemented in connection with a general purpose computer or as dedicated hardware. For example, a caller communication device 114 or a contact center communication device 116 generally include a telephony 216 and/or communication 218 application and an operating system 232, but generally does not include a routing engine 220, or resource status 224 or work item status 228 modules. A contact center communication device 116 may include some features or components associated with a routing engine 220, a resource status module 224 and/or a work item status module 228. For example, as described elsewhere herein, a contact center communication device 116 can include resource status module 224 features associated with the provision of an estimated time of availability by an agent for use by the routing engine 220 on the switch 104 to calculate an estimated wait time. Alternatively or in addition, features of the resource status module 224 implemented in connection with a contact center communication device 116 may be executed by the processor 204 and programming 224 on the switch 104, and presented by the contact center communication device 116 with minimal or no processing on that device 116.

Figure 3:
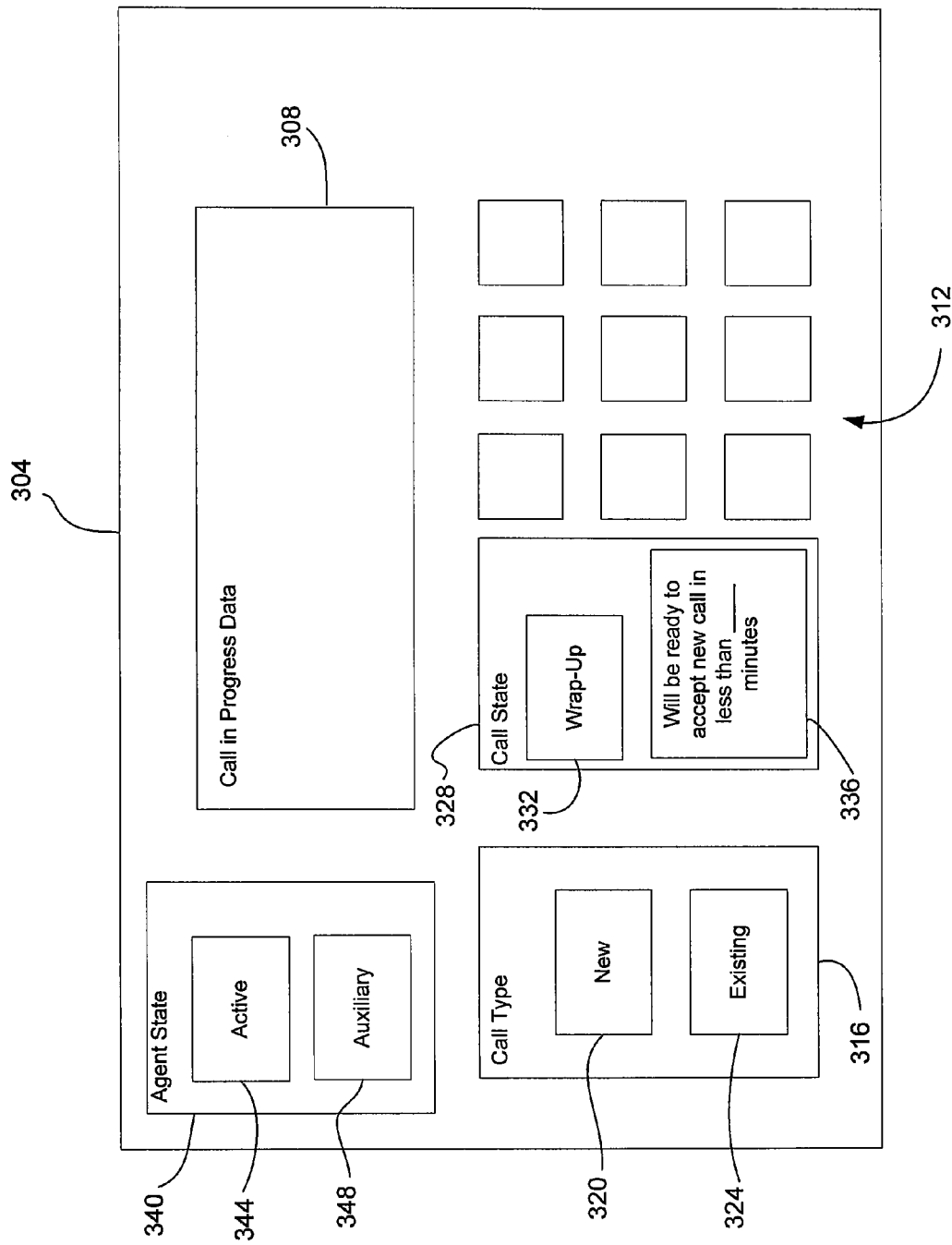
FIG. 3 depicts a graphical user interface displayed to an agent in accordance with embodiments of the present invention.

FIG. 3 depicts a graphical user interface 304 displayed to an agent 120 associated with a contact center communication device 116 in accordance with embodiments of the present invention by a user output 240 associated with that contact center communication device 116. According to this exemplary graphical user interface display 304, an area containing call in progress data 308 is displayed to the agent 120. The call in progress data 308 can include any data associated with a communication. Accordingly, the graphical user interface 304 can be understood to operate in cooperation with a softphone application or telephony application 216, or other communication application 218. Examples of the call in progress data 308 include the time the call has been active, and information identifying the caller 114, or information related to the caller 114 or the subject matter of the contact. Alternatively or in addition, the call in progress data 308 can provide a window in which text based information can be exchanged between a caller 114 and the agent 120.

The graphical user interface 304 may additionally present control buttons 312. These control buttons 312 generally allow the agent 120 to control aspects of the operation of the contact center communication device 116. Accordingly, control buttons 312 may be provided for performing such functions as dropping a call, conferencing in another party, placing an active call on hold, and activating a mute function. The control buttons 312 may also present a virtual keyboard or virtual numeric keypad. In addition, in accordance with embodiments of the present invention, call control buttons 312 are provided to allow an agent 120 to indicate information related to a time to availability of the agent 120. More particularly, at least some of the call control buttons 312 allow an agent 120 to provide information that can be used by the server 104 in calculating the time remaining until the agent 120 will be available to handle a work item or a next work item. As can be appreciated by one of skill in the art, the control buttons 312 may comprise soft keys that change in content based on the context of operations being performed by or in association with the agent 120. In addition, the control buttons 312 may be operated or selected using a pointing device controlled by the agent 120. Alternatively, some or all of the control buttons may comprise or be operated through a user input 236 comprising hardware.

In accordance with embodiments of the present invention, control buttons 312 can include buttons that allow an agent 120 to indicate a call type 316. For example, a "new" button 320 may be selected by the agent 120 to indicate that a communication pertains to a caller 114 who is a new customer or who may otherwise require additional assistance. An "existing" button 324 may also be provided. By indicating whether the caller is a new or existing client or customer, the agent 120 can provide information used by the routing engine 220 running on the switch 104 for estimating the amount of time remaining until the agent 120 will complete a call in progress.

Another example of a control button 312 provided by a user interface display 304 in accordance with embodiments of the present invention is a set of call state buttons 328. Call state buttons 328 can include a wrap-up button 332. By selecting the wrap-up button 332, an agent 120 can indicate that a call in progress is in a wrap-up state. This information can be used by the routing engine 220 on the switch 104 in estimating the amount of time until the agent 120 is available to handle another call or work item. Call state buttons 328 can also include a numeric input button or field 336. More particularly, the numeric input button or field allows the agent 120 to specify the expected duration of a call in progress in minutes or other units of time. As shown in FIG. 3, the numeric input may be selected by the agent 120. Alternatively or in addition, call state buttons 328 that specify different amounts of expected call durations (e.g., one, five and ten minutes) can be provided.

Further examples of control buttons 312 that can be provided by a user interface display 304 in accordance with embodiments of the present invention is a set of agent state buttons 340. The agent state buttons 340 can include an active state button 344 and an auxiliary state button 348. This information regarding the agent's 120 state can be used by the routing engine 220 on the switch 104 in estimating the amount of time until the agent 120 is available to handle another call or work item.

Figure 4:
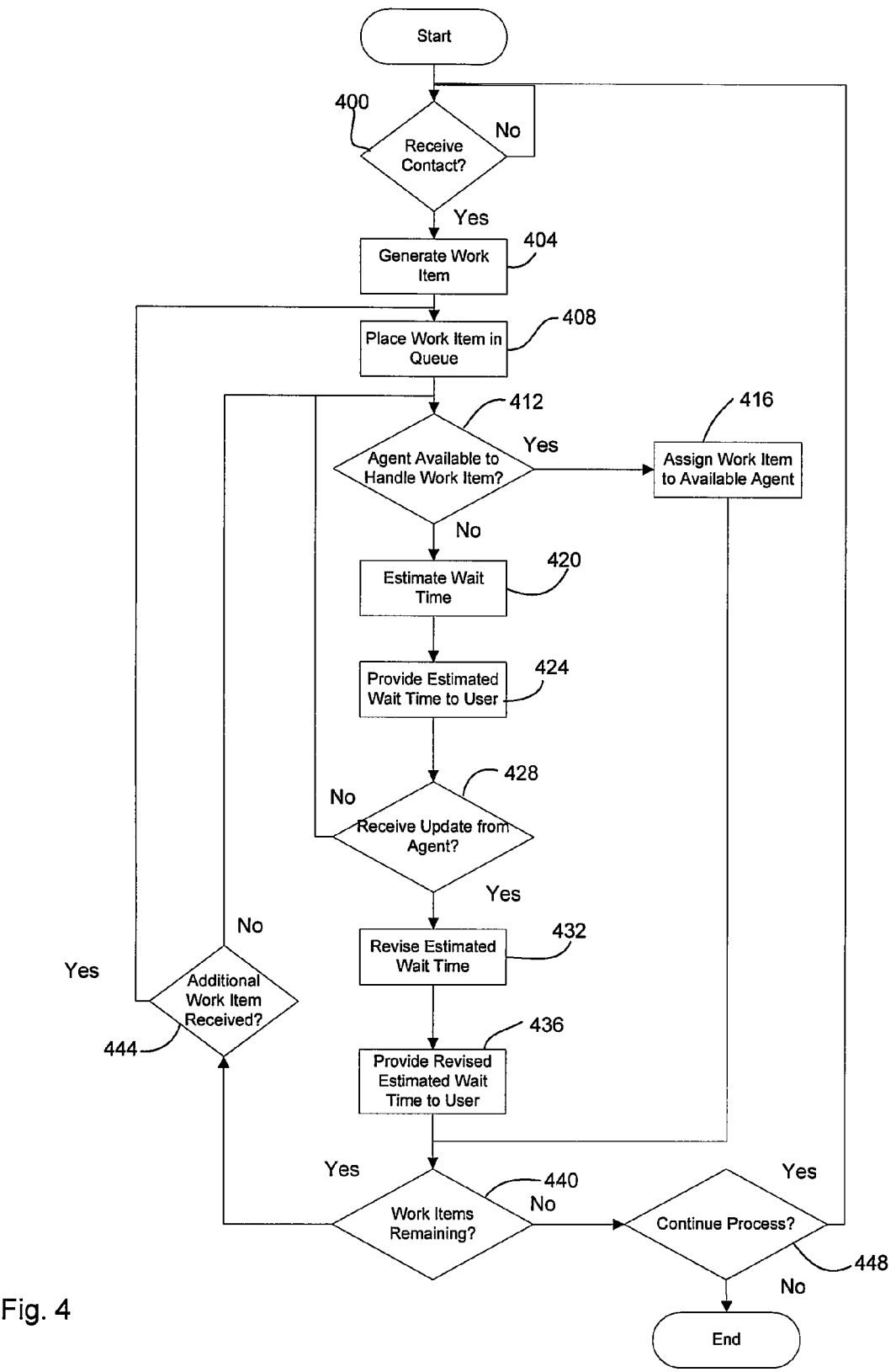
FIG. 4 is a flowchart depicting aspects of the operation of a system in accordance with embodiments of the present invention.

FIG. 4 illustrates aspects of the operation of a system 100 in accordance with embodiments of the present invention. Initially, at step 400, a determination is made as to whether a contact (e.g., a call) has been received. If no contact has been received, the process may idle at step 400. As can be appreciated by one of skill in the art after consideration of the present disclosure, embodiments of the present invention are applicable to predictive dialing systems, as well as or in addition to contact centers receiving incoming communications. Accordingly, receiving a contact can include determining that an outgoing call should be placed.

After a contact has been received (or determining that a call should be placed), a work item is generated (step 404). As can be appreciated by one of skill in the art, a work item can include a token or marker used to track the contact. Moreover, the work item can include information identifying the contact, or information related to the contact. The work item can then be placed in a queue 222 (step 408). As can be appreciated by one of skill in the art, a call center 124 can implement multiple queues 222. Moreover, queues 222 can be differentiated from one another based on the subject matter of included work items, the priority of included work items, or other criteria.

At step 412, a determination is made as to whether an agent 120 is available to handle a work item in the queue 222. If an agent 120 is available, the work item is assigned to the available agent (step 416). If an agent is not available to handle a work item, an estimated wait time for the work item is calculated (step 420). As can be appreciated by one of skill in the art, the estimated wait time for a work item can be calculated from the rate at which agents 120 servicing a queue 222 normally become available. As a further example, the estimated wait time may be calculated by determining an average rate of advance for work items in a queue 222 by multiplying the average rate of advance by the position of the work item within the queue 222. At step 424, the estimated wait time is provided to a user or caller 114 associated with the work item.

Embodiments of the present invention allow for input from agents 120 servicing queues 222 related to their availability. Accordingly, at step 428, a determination may be made as to whether an update has been received from an agent 120 regarding the agent's availability. If no update is received, the process may return to step 412, and, if no agent is available, provide further estimated wait times conventionally.

In accordance with embodiments of the present invention, updates from an agent 120 can be in various forms. For instance, by indicating a call type 316 as being either new 320 or existing 324, an agent 120 provides additional information that can be applied by the switch 104, and more particularly to the resource status module 224, to refine the estimated wait time that is reported to the caller 114. More particularly, and as an example, a call type regarding a caller 114 who is a new customer may take longer to process on average than a work item concerning a caller 114 who is an existing customer. Therefore, by indicating whether the caller 114 is a new or existing customer, the agent 120 can provide information that allows the server 104 to more accurately calculate the expected wait time.

As another example, by indicating the current state of a call using call state buttons 328, an agent 120 can provide information that allows the switch 104 to calculate a more accurate estimated wait time. For instance, if an agent 120 selects the wrap-up button 332, the switch 104 is informed that the agent 120 is nearing completion of a current call, and will soon be available to handle a next work item. As another example, by indicating a time until the agent 120 expects to be available using the numeric input or field 336, the server 104 can be provided with specific information from the agent 120 regarding the agent's 120 estimate as to when that agent 120 will be available to handle a next work item.

As still further examples, the estimated wait time for a work item can be more accurate when an agent 120 specifies the current state of the agent using the agent state buttons 340. More particularly, by selecting an active state button 344, an agent 120 can indicate that they are actively handling work items, and are properly included in a calculation of expected wait times for work items in queue. As another example, by selecting an auxiliary state button 348, an agent 120 can indicate that they are not actively handling work items, therefore that they should not be included in calculations of expected wait times.

In accordance with embodiments of the present invention, an agent 120 can select more than one control button 312. Accordingly, the server 104 can be provided with multiple pieces of information regarding the availability of an agent 120.

After receiving an update from an agent 120, the estimated wait time can be revised (step 432). The revised estimated wait time can then be provided to users or callers 114 (step 436). As can be appreciated by one of skill in the art after consideration of the present disclosure, the revised estimated wait time will generally be more accurate, because it benefits from the information provided by the agent or agents 120 regarding their availability. More particularly, embodiments of the present invention enable the consideration of information provided from agents 120 regarding their availability, to provide more accurate estimates of wait times for work items. Moreover, the revised estimated wait time can be provided to some or all work items that are awaiting service in a queue serviced by an agent 120 that has provided an update on their availability. More particularly, although the estimated or revised estimated wait time that is provided with respect to a particular work item will depend on the position of that particular work item in the queue 222, all work items in the queue 222 can be provided with a revised estimated work time.

At step 440, a determination may be made as to whether there are work items remaining to be serviced. If additional work items remain, a further determination may be made as to whether an additional work item has been received (step 444). If an additional work has been received, the process may return to step 408, and that additional work item or work items is placed in the queue 222. If an additional item has not been received, the process may return to step 412, and a determination made as to whether an agent is available to handle a remaining work item. If no work items remain, a determination may be made as to whether the process is to be continued (step 448). If the process is to be continued, it may return to step 400. If the process is not to be continued it may end.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for estimating a wait time, comprising:
receiving a first work item at a server;
calculating by the server an estimated wait time for the first work item;
receiving at the server a first indication from a first agent of a time to availability of the first agent, wherein the first indication from the first agent of a time to availability of the first agent includes a numeric value;
receiving at the server a first indication from the first agent of at least one of a call type and a call state of a current call;
in response to receiving the first indication from the first agent of a time to availability of the first agent and further in response to receiving the first indication from the first agent of the at least one of a call type and a call state of a current call, calculating by the server a revised estimated wait time for the first work item, wherein the calculation of the revised estimated wait time considers the first indication from the first agent of a time to availability of the first agent and considers the first indication from the first agent of the at least one of a call type and a call state of a current call;

communicating the revised estimated wait time to a user associated with the first work item.

2. The method of claim 1, further comprising:

placing the first work item in a first queue, wherein the first work item is received from a communication network.

3. The method of claim 2, further comprising:

while the first work item is in the first queue, receiving a first indication from a second agent of a time to availability of the second agent;

in response to receiving the indication from the second agent of a time to availability of the second agent, calculating a further revised estimated wait time for the first work item that considers the indication of a time to availability received from the second agent, wherein the further revised estimated work time that considers the indication of a time to availability received from the second agent is calculated after the revised estimated wait time for the first work item that considers the indication of a time to availability received from the first agent;

communicating the further revised estimated wait time to the user associated with the first work item.

4. The method of claim 1, further comprising:

receiving a second work item from the communication network;

placing the second work item in the first queue, wherein the first work item and the second work item are in the first queue simultaneously;

calculating an estimated wait time for the second work item in the first queue;

receiving one of a second indication from the first agent or a first indication from a second agent of a time to availability of the one of the first agent or the second agent;

in response to receiving the indication from one of the first agent or the second agent of a time to availability, calculating a revised estimated wait time for the second work item that considers the indication of a time to availability received from the one of the first agent and the second agent;

communicating the revised estimated wait time to a user associated with the second work item.

5. The method of claim 1, further comprising:

requesting from the first agent an indication of a time to availability of the first agent.

6. The method of claim 5, further comprising:

the first agent providing an indication of a time to availability in response to the request for an indication of a time to availability.

7. The method of claim 6, wherein the first agent is handling a call in progress when the first agent provides the indication of a time to availability, and wherein the first agent specifies a time to availability in response to the request.

8. The method of claim 6, wherein in response to the request for an indication of a time to availability the first agent indicates that the first agent is in a wrap-up state.

9. The method of claim 6, wherein in response to the request for an indication of a time to availability the first agent indicates that the first agent is in an auxiliary state.

10. The method of claim 6, wherein the indication of a time to availability of the first agent includes a period of time specified by the first agent.

11. The method of claim 5, wherein requesting from the first agent an indication of a time to availability includes displaying a user interface to the first agent, wherein the user interface includes a soft button for accepting an indication from the first agent of a time to availability of the first agent.

12. The method of claim 1, wherein the method is performed by computer included as part of a call center interconnected to the communication network executing instructions stored in a non-transitory form in a computer readable storage medium.

13. A contact center, comprising:

a plurality of contact center communication devices, including;

an agent interface operable to receive at least first input from a first agent related to an availability of the first agent;

a server in communication with the plurality of contact center communication devices, the server including:

at least a first queue established in memory on the server;

a call routing engine comprising instructions executed by a processor included in the server, wherein at least some work items are routed to the at least a first queue, wherein first input from the first agent related to an availability of the first agent includes a time value that is entered by the first agent and communicated from a first one of the plurality of contact center communication devices to the server, wherein second input from the first agent related to at least one of a call type and a call state of a current call is entered by the first agent and communicated from the first state one of the plurality of contact center communication devices to the server, wherein an estimated wait time is calculated for at least one work items included in the work items routed to the at least a first queue, and wherein the first input from the first agent related to an availability of the first agent and the second input from the first agent related to at least one of a call type and a call state of a current call is used to calculate the estimated wait time for the at least one work item.

14. The contact center of claim 13, further comprising:

a plurality of client communication devices;

a communication network, wherein the server is interconnected to at least one of the plurality of client communication devices by the communication network, and wherein the server provides the estimated wait time for the at least one work item to the at least one of the plurality of client communication devices.

15. The contact center of claim 14, wherein third input from the first agent related to an availability of the first agent is communicated from the first one of the plurality of contact center communication devices to the server, wherein a revised estimated wait time is calculated for the at least one work item, wherein the third input from the first agent related to an availability of the first agent is used to calculate the revised estimated wait time for the at least one work item, and wherein the revised estimated wait time is provided to the at least one of the plurality of client communication devices.

16. The method of claim 1, wherein the numeric value included in the first indication from the first agent of a time to availability of the first agent specifies an expected duration of a call in progress in units of time.

17. The method of claim 1, further comprising:

receiving a call state indication from the first agent.

* * * * *

UNITED STATES PATENT AND TRADEMARK OFFICE
CERTIFICATE OF CORRECTION

PATENT NO. : 8,861,710 B2  Page 1 of 1
APPLICATION NO. : 12/783272
DATED : October 14, 2014
INVENTOR(S) : Krishna Nimmagadda It is certified that error appears in the above-identified patent and that said Letters Patent is hereby corrected as shown below:

In the Claims

At Column 10, line 30, after the word "first" please delete the word "state" therein.

Signed and Sealed this
First Day of September, 2015

Michelle K. Lee
*Director of the United States Patent and Trademark Office*